Patented Sept. 28, 1954

2,690,260

UNITED STATES PATENT OFFICE 2,690,260

FROTH FLOTATION PROCESS

Reginald Harold Hall, Sutton, David Ian Hutchinson Jacobs, Carshalton, and Maurice Victor Jacquet, Banstead, England, assignors to The Distillers Company Limited, Edinburgh, Scotland, a British company No Drawing. Application October 2, 1952, Serial No. 312,847

Claims priority, application Great Britain October 16, 1951

9 Claims. (Cl. 209—166)

Froth flotation processes for the concentration and purification of many materials such as metallic and non-metallic ores and coal are well known. In such processes water containing frothing agents is added to the materials and separation is effected by selective flotation.

The object of the invention is to provide a process which is carried out with the aid of new frothing agents, whereby greater efficiency is obtained.

The present invention is for a method of effecting the concentration of minerals by flotation which comprises the steps of adding to the mineral pulp, in the capacity of a frothing agent, an ester of an alkane dicarboxylic acid in which the carboxyl groups are separated by a straight chain of three or more carbon atoms, some or all of which may carry substituents, the molecular weight of the ester being limited so that the compound is sufficiently water-soluble to act as a frothing agent.

The ester employed as frothing agent is suitably an alkyl or substituted alkyl ester of said dicarboxylic acid, the radicals derived from the alcohols forming the esters, termed for convenience ester radicals, being the same or different. Said ester radicals are suitably methyl, ethyl, propyl, isopropyl, butyl or higher alkyl radicals, or alkyl radicals bearing as substituents radicals such as alkoxy, for example methoxy, ethoxy or isopropoxy, hydroxy, halogen for example chlorine, amino and like radicals. The alkane dicarboxylic acid forming the ester may also bear substituents such as alkyl radicals, for example methyl, ethyl, propyl or butyl radicals, or substituted alkyl radicals, for example alkoxy, such as methoxy, ethoxy or isopropoxy, hydroxy, carboxy, carbalkoxy, halogen or amino substituted alkyl radicals, or halogen radicals such as chlorine or bromine radicals, or hydroxyl radicals or carboxy or carbalkoxy radicals, or amino radicals or substituted amino radicals. Although the two carboxyl groups of the dicarboxylic acid need not be at the end of the carbon chain, provided that they are separated by at least three carbon atoms, it has been found suitable to use in the process of the present invention the ester, for example an alkyl diester, of a straight chain alkane alpha-omega dicarboxylic acid. Such diesters which have been found particularly suitable are of the general formula,

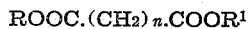

where R and $R^1$ are alkyl radicals, the same or different and $n$ is 4 or 5.

Among the compounds which may be used in the process of the present invention may be mentioned the alkyl, for example, dimethyl, diethyl, dipropyl, dibutyl and the alkoxy substituted alkyl, for example methoxy, ethoxy and isopropoxy substituted ethyl, propyl and butyl, esters of glutaric acid, adipic acid, pimelic acid and suberic acid and alkyl substituted, for example methyl, ethyl, propyl, dimethyl, diethyl, dipropyl substituted, glutaric, adipic, pimelic and suberic acids, and alkoxy substituted, for example methoxymethyl, ethoxymethyl, dimethoxymethyl, diethoxymethyl substituted glutaric, adipic, pimelic and suberic acids. Compounds which it is preferred to employ include diethyl adipate, diethyl pimelate, di(3-methoxypropyl) pimelate, di-isopropyl pimelate and diethyl-4:4-dicarbethoxypimelate.

The compounds employed according to the present invention as frothing agents may be used either in pure form, or in impure form as for example admixed with the by-products co-produced with them, or alternatively admixed with compounds having frothing properties, for example the tetra-alkoxy derivatives of paraffins such as 1:1:2:2-tetra-ethoxy-ethane, 1:1:2:2-tetranormal- propoxyethane, 1:1:2:2 - tetrabutoxythane, 1:1:3:3 - tetranormal - propoxypropane, 1:1:4:4 - tetramethoxybutane and 1:1:5:5-tetraethoxy-pentane.

One noteworthy advantage of the froth flotation agents according to the present invention is that satisfactory frothing is obtained with the aid of a very much smaller proportion thereof than as compared with previously used froth flotation agents, such as steam distilled pine oil.

The froth flotation agents according to the present invention are capable of producing a froth that is not noticeably brittle or weeping and which obviates the need for the addition of froth-stiffening substances.

The present invention for the treatment of minerals by froth-flotation is of particular application in the treatment of sulphidic ores such as copper-containing sulphidic ores, but is also applicable to the treatment of other ores such as lead, zinc, iron, molybdenum, nickel and gold sulphide and non-sulphide ores and also to mineral ores such as coal ores.

The froth flotation process may be carried out as used or described in the art, the frothing agents herein disclosed being suitable for use with or without collecting agents, modifying agents, activating agents and other froth flotation reagents, and otherwise applicable to the processes generally employed. The conditions most suitable for operation, that is the amount of the frothing agent, the particle size of the ore, the temperature, the pH of the mixture, the proportion of ore in the pulp, the addition of other agents and adjuncts for the process, are readily determinable by one skilled in the art. We have found the use of amounts of the froth flotation agents of our invention in the range 0.0001% to 0.05%, and preferably about 0.0004 to 0.001% by weight based on the weight of the ore satisfactory.

In the flotation of sulphidic and oxidised metallic ores, compounds such as the xanthates, such as ethyl xanthate, dithio-phosphates, phosphocresylic acids and diphenyl thiourea, are frequently used as collecting agents, while in the flotation of non-metallic ores, fatty acids and fatty acid soaps are normally used as collecting agents.

The following examples are given to illustrate the process of the present invention. The parts and percentages referred to are by weight:

Example 1

520 parts of a siliceous copper ore containing chalcocite, chalcopyrite and bornite, is ground with 200 parts of water in a rod mill to minus 80 mesh particle size. The pulp is transferred to a Fagergren flotation machine and 0.05 part of potassium ethyl xanthate is added thereto. The pulp is diluted with 3000 parts of water, 0.0062 part of diethyl adipate is added thereto as frothing agent, and the mixture is then conditioned without aeration for four minutes. The pH of the pulp is about 7.2. Aeration is then applied, and the froth is removed for 10 minutes. The froth obtained is not brittle or weeping and no stiffener is added thereto.

For purposes of comparison the above process is repeated exactly as described above, with the exception that the 0.0062 part of diethyl adipate is replaced by 0.0115 part of pine oil.

The results obtained in both cases are shown in the table below:

| Frother | Percent Frother on ore | Percent Copper in ore | Percent Copper in concentrate | Percent Copper in tailings | Percent Recovery of copper |
|---|---|---|---|---|---|
| Diethyl adipate | 0.0011 | 5.13 | 61.9 | 0.32 | 94.4 |
| Pine oil | 0.0022 | 5.40 | 59.0 | 0.33 | 94.3 |

Example 2

500 parts of a siliceous copper ore containing chalcocite, chalcopyrite and bornite are ground with 200 parts of water in a rod mill to minus 80 mesh particle size. The pulp is transferred to a Fagergren flotation machine and 0.005 part of potassium ethyl xanthate is added thereto. The pulp is diluted with 3000 parts of water, 0.0020 part of di-(3-methoxypropyl) pimelate is added as frothing agent and the mixture is then conditioned without aeration for 2 minutes. The pH of the pulp is about 7.2. Aeration is then applied and the froth is removed for 8 minutes. The froth obtained is not brittle or weeping and no stiffener is added to it.

For purposes of comparison the process is repeated exactly as described above with the exception that the 0.0020 part of di-(3-methoxypropyl) pimelate is replaced by 0.0068 part of pine oil. The results obtained in both cases are shown in the table below:

| Frother | Percent Frother on ore | Percent Copper in ore | Percent Copper in concentrate | Percent Copper in tailings | Percent Recovery of copper in concentrate |
|---|---|---|---|---|---|
| Di(3-methoxypropyl)-pimelate | 0.0004 | 4.42 | 59.1 | 1.06 | 77.3 |
| Pine oil | 0.0014 | 4.07 | 60.3 | 1.04 | 75.1 |

The process of Example 2 is repeated exactly as described above using in place of the di-(3-methoxypropyl) pimelate the same amount of one of the following compounds: dibutyl glutarate, di-isopropyl adipate, diethyl pimelate, di-isopropyl pimelate, dimethyl suberate, methylbutyl adipate, ethyl-isopropyl pimelate, di-(3-methoxy-butyl) adipate, di-(3-ethoxypropyl) pimelate, di-(2-isopropoxy-ethyl) suberate, diethyl-4:4-dicarbethoxypimelate, dimethyl beta-ethylpimelate, diethyl beta-methyladipate, di-isopropyl beta-isopropyl suberate, di-isopropyl beta-methoxymethyl glutarate, dimethyl beta-methoxymethyl beta-ethoxymethyl pimelate and dimethyl - beta - methyl - gammaethoxymethyl-adipate. Similar satisfactory results are obtained in each case.

We claim:

1. In a method of effecting the concentration of minerals by flotation, the steps of adding to the mineral pulp, in the capacity of a frothing agent, a diester selected from the group consisting of lower alkyl and substituted lower alkyl diesters of an alkane dicarboxylic acid in which the carboxyl groups are separated by a straight chain of at least three carbon atoms, "lower alkyl" signifying alkyl containing from one to four carbon atoms, and subjecting the resultant mixture to a flotation operation.

2. A froth flotation process as claimed in claim 1 wherein the diester is of the general formula $ROOC-(CH_2)_n-COOR^1$ wherein R and $R^1$ are lower alkyl radicals and $n$ is an integer not less than 4 and not more than 5.

3. A froth flotation process as claimed in claim 1 wherein the diester is selected from the group consisting of lower alkyl and alkoxy substituted lower alkyl diesters of acids selected from the group consisting of glutaric acid, adipic acid, pimelic acid, suberic acid, lower alkyl substituted and alkoxy substituted glutaric, adipic, pimelic and suberic acids, "lower alkyl" signifying alkyl containing from one to four carbon atoms.

4. A froth flotation process as in claim 1 wherein the diester is diethyl adipate.

5. A froth flotation process as in claim 1 wherein the diester is diethyl pimelate.

6. A froth flotation process as in claim 1 wherein the diester is di-(3-methoxypropyl) pimelate.

7. A froth flotation process as in claim 1 wherein the diester is di-isopropyl pimelate.

8. A froth flotation process as in claim 1 wherein the diester is diethyl-4:4-dicarbethoxypimelate.

9. A froth flotation process as in claim 1 wherein other compounds having froth forming properties are mixed with the frothing agent.

References Cited in the file of this patent

UNITED STATES PATENTS

| Number | Name | Date |
|---|---|---|
| 2,561,251 | Potgieter | July 17, 1952 |
| 2,591,289 | Powell | Apr. 1, 1952 |
| 2,611,485 | Tveter | Sept. 23, 1952 |